(12) United States Patent
Resca Cacciari et al.

(10) Patent No.: US 9,051,131 B2
(45) Date of Patent: Jun. 9, 2015

(54) BRAKING UNIT (75) Inventors: Sergio Resca Cacciari, Bologna (IT); Alessandro Marino, Malalbergo (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 62 days.

(21) Appl. No.: 13/816,055

(22) PCT Filed: Aug. 22, 2011

(86) PCT No.: PCT/EP2011/064405
§ 371 (c)(1),
(2), (4) Date: Feb. 8, 2013

(87) PCT Pub. No.: WO2012/028485
PCT Pub. Date: Mar. 8, 2012

(65) Prior Publication Data
US 2013/0126301 A1 May 23, 2013

(30) Foreign Application Priority Data

Sep. 1, 2010 (EP) ..................................... 10174901

(51) Int. Cl.
*B65G 47/26* (2006.01)
*B65G 47/00* (2006.01)
*B65G 47/88* (2006.01)

(52) U.S. Cl.
CPC ............ *B65G 47/26* (2013.01); *B65G 47/8861* (2013.01)

(58) Field of Classification Search
CPC .............................. B23Q 7/1426; B65G 67/00
USPC ......... 198/530, 345.1, 345.3, 531.534, 468.3; 193/35 A
See application file for complete search history.

(56) References Cited

U.S. PATENT DOCUMENTS

| | | | |
|---|---|---|---|
| 1,508,369 A | 9/1924 | Johnson | |
| 3,244,322 A | 4/1966 | Jacklevich | |

(Continued)

FOREIGN PATENT DOCUMENTS

| | | |
|---|---|---|
| DE | 3905955 A1 | 11/1989 |
| JP | 49-7829 | 2/1974 |

(Continued)

OTHER PUBLICATIONS

International Search Report (PCT/ISA/210) issued on Nov. 8, 2011, by the European Patent Office as the International Searching Authority for International Application No. PCT/EP2011/064405.

(Continued)

*Primary Examiner* — Gene Crawford
*Assistant Examiner* — Lester Rushin
(74) *Attorney, Agent, or Firm* — Buchanan Ingersoll & Rooney PC (57) ABSTRACT

A braking unit for selectively stopping one or more items advanced by a conveyor along a transferring path comprises: a first and a second braking element arranged on opposite sides of the conveyor and facing each other; an actuator which can be selectively activated for moving the first braking element towards the second braking element so as to clamp the item or items to be braked between the first and second braking element; and a lever connecting the actuator to the first braking element and extendible towards the second braking element as a result of the thrust exerted on the first braking element by the item or items to be braked.

18 Claims, 7 Drawing Sheets

(56) References Cited

U.S. PATENT DOCUMENTS

| | | | | |
|---|---|---|---|---|
| 3,527,333 | A | * | 9/1970 | Sorensen et al. .............. 198/458 |
| 4,174,777 | A | * | 11/1979 | Riehle ...................... 198/781.06 |
| 2003/0111321 | A1 | | 6/2003 | Van Oss et al. |
| 2009/0107268 | A1 | * | 4/2009 | Suter ............................ 74/89.14 |

FOREIGN PATENT DOCUMENTS

| JP | 07-13833 U | 3/1995 |
|---|---|---|
| JP | 2001-163444 A | 6/2001 |

OTHER PUBLICATIONS

Written Opinion (PCT/ISA/237) issued on Nov. 8, 2011, by the European Patent Office as the International Searching Authority for International Application No. PCT/EP2011/064405.

Office Action issued by the Japan Patent Office on Jan. 19, 2015 in corresponding Japanese Application No. 2013-526400, and English language translation of Office Action (11 pages).

* cited by examiner

BRAKING UNIT

TECHNICAL FIELD

The present invention relates to a braking unit for selectively stopping one or more items advanced by a conveyor along a transferring path.

The present invention may be used to particular advantage in plants for the production of packages of pourable food products, to which the following description refers purely by way of example.

BACKGROUND ART

As is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; the web of packaging material so sterilized is maintained in a closed, sterile environment, and is folded and sealed longitudinally to form a vertical tube.

The tube is filled continuously downwards with the sterilized or sterile-processed food product, and is sealed and then cut along equally spaced cross sections to form pillow packs, which are then fed to a folding unit to form the finished, e.g. substantially parallelepiped-shaped packages.

Alternatively, the packaging material may be cut into blanks, which are formed into packages on forming spindles, and the packages are filled with the food product and sealed. One example of this type of package is the so-called "gable-top" package known by the trade name Tetra Rex (registered trademark).

The so obtained packages are conveyed from the packaging machine to further stations, in which, for instance, such packages are provided with opening or drinking features, such as opening devices, straws, etc., and/or in which they are grouped and shrink-wrapped, so as to form multi-packs adapted to be stacked in a number of horizontal layers on respective pallets destined to the retail outlets.

During the transfer from one processing station to the others, it may be necessary to stop the packages or the multi-packs at certain points of the relative conveying lines. This may occur, for instance, where two conveying lines converge in one downstream line: in this case, the packages or multi-packs arriving on one of the converging lines have to be stopped to avoid collision with the packages or multi-packs arriving at the same time on the other line.

Alternatively, it may be necessary to stop the packages or multi-packs along a relative conveying line when a breakdown occurs in the downstream processing station or even when a batch of such packages or multi-packs has to be separated from the others in the row.

In all these cases, the stopping action is performed by braking units, which are typically formed by a pair of belts arranged on both sides of the conveyor for advancing the packages or multi-packs; each belt moves along a relative closed loop comprising a work portion, cooperating with the packages or multi-packs advanced on the relative conveyor, and a return portion.

The belts can be selectively stopped to brake the row of packages or multi-packs moved by the conveyor; the force applied by the belts onto the packages or multi-packs is quite relevant as it is normally designed to withstand the thrust exerted by a great deal of items in the row.

Such relevant force may, under particular circumstances and especially when the row is formed by a reduced number of packages or multi-packs, damage the latter and/or cause the detachment of the straws.

Moreover, the relevant force applied by the belts may hurt the user in the event that the latter puts his fingers or other parts of his body between the belts and the row of packages or multi-packs; for this reason, it is normally required to arrange protective panels or devices around the area in which the belts perform their action.

Finally, it should also be observed that, when the number of packages or multi-packs in the row exceeds a certain predetermined value, the belts may loose their effectiveness.

In the light of the above, a need is felt within the industry to provide a braking unit, which is effective in stopping any number of packages or multi-packs in a row without damaging them.

A need is also felt within the industry to provide a braking unit, which is effective in stopping any number of packages or multi-packs in a row and which is safe for the user so as to not require any protection device around the working area.

DISCLOSURE OF THE INVENTION

It is an object of the present invention to provide a braking unit designed to meet at least one of the above-identified needs.

According to the present invention, there is provided a braking unit as claimed in claim 1.

BRIEF DESCRIPTION OF THE DRAWINGS

Two preferred, non-limiting embodiments of the present invention will be described by way of example with reference to the accompanying drawings, in which.

BEST MODE FOR CARRYING OUT THE INVENTION

Figure 1:
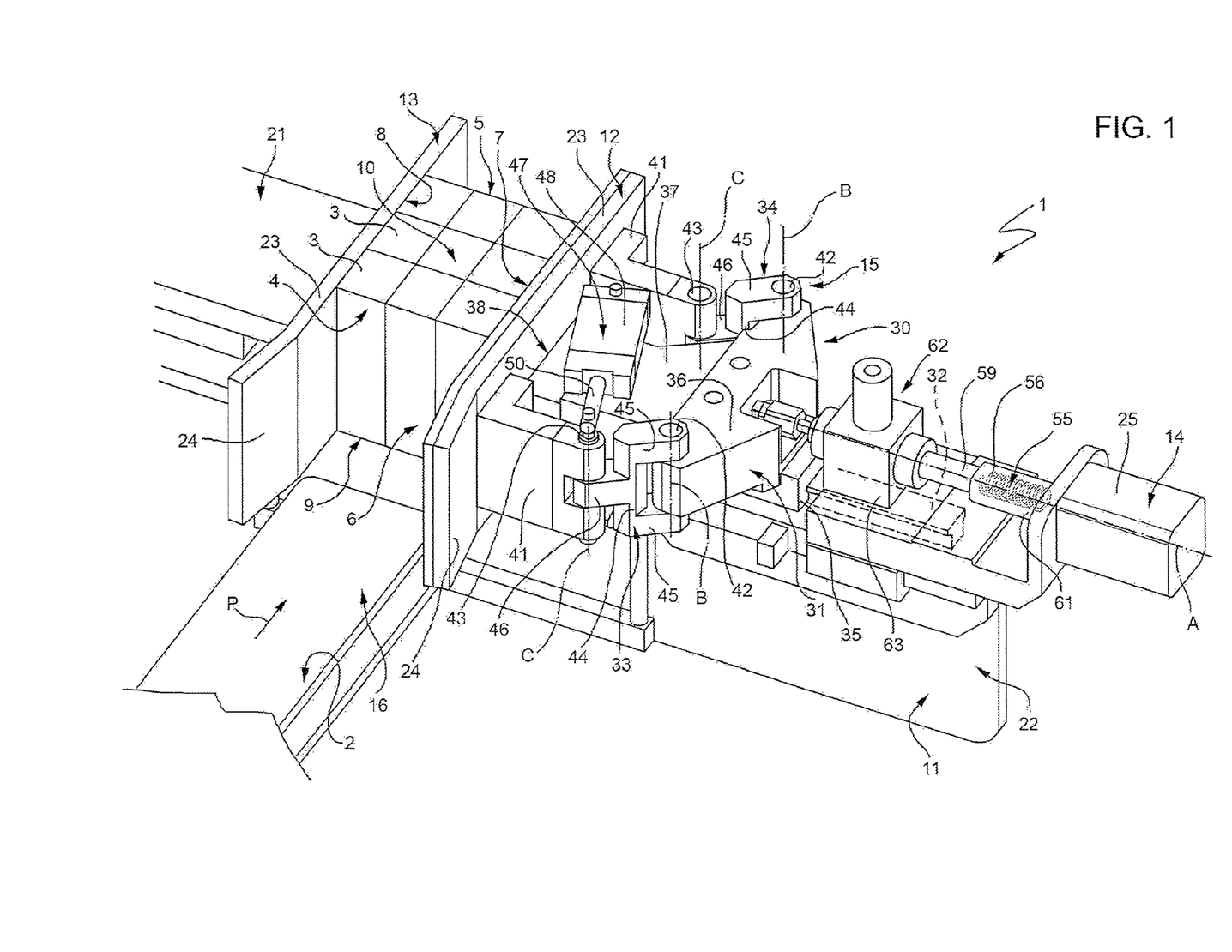
FIG. 1 shows a view in perspective of a braking unit in accordance with the teachings of the present invention for selectively stopping one or more packages advanced by a conveyor along a transferring path.
Figure 2:
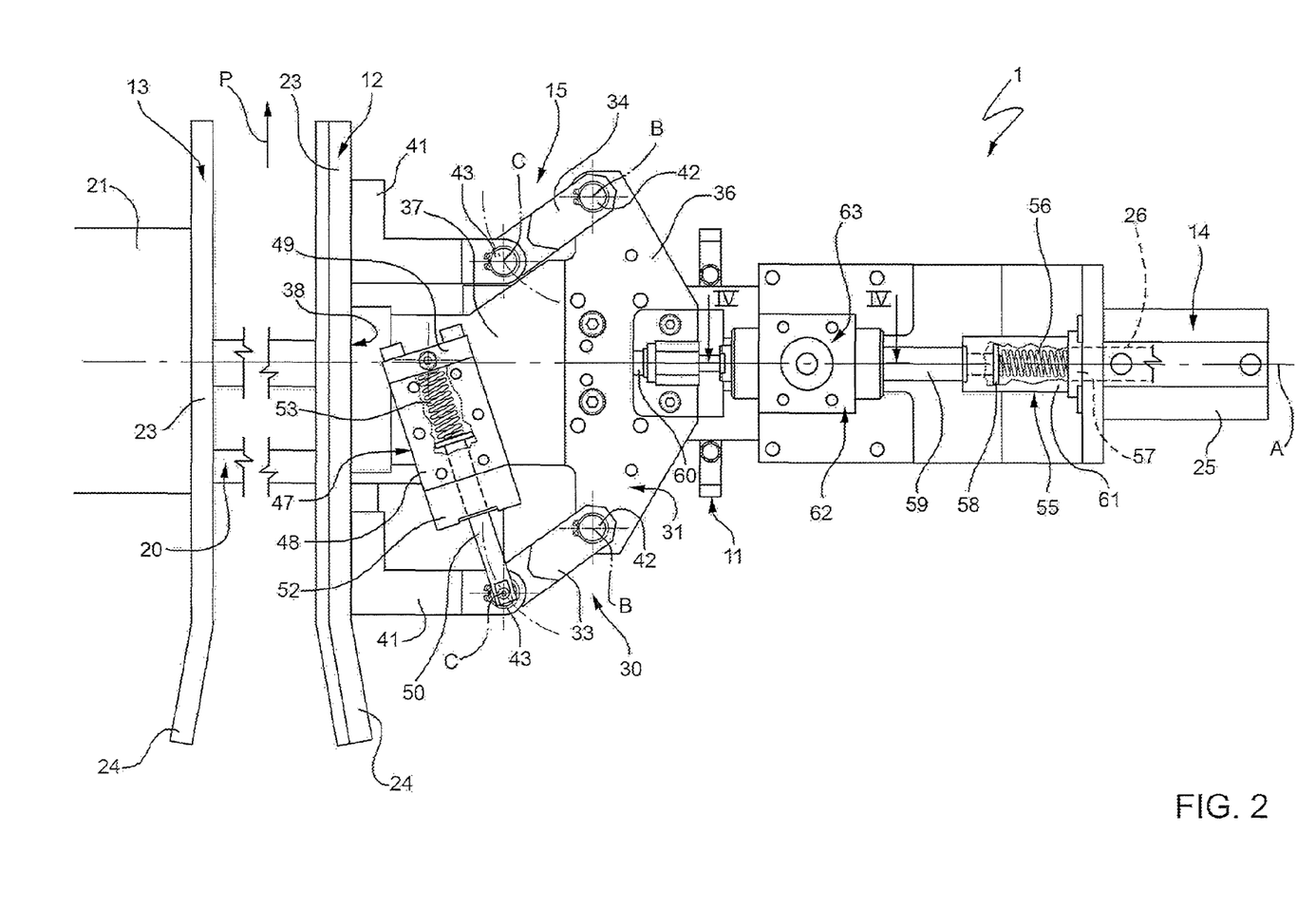
FIGS. 2 and 3 show respective top plan views, with parts removed for clarity, of the FIG. 1 braking unit in different operating conditions.
Figure 3:
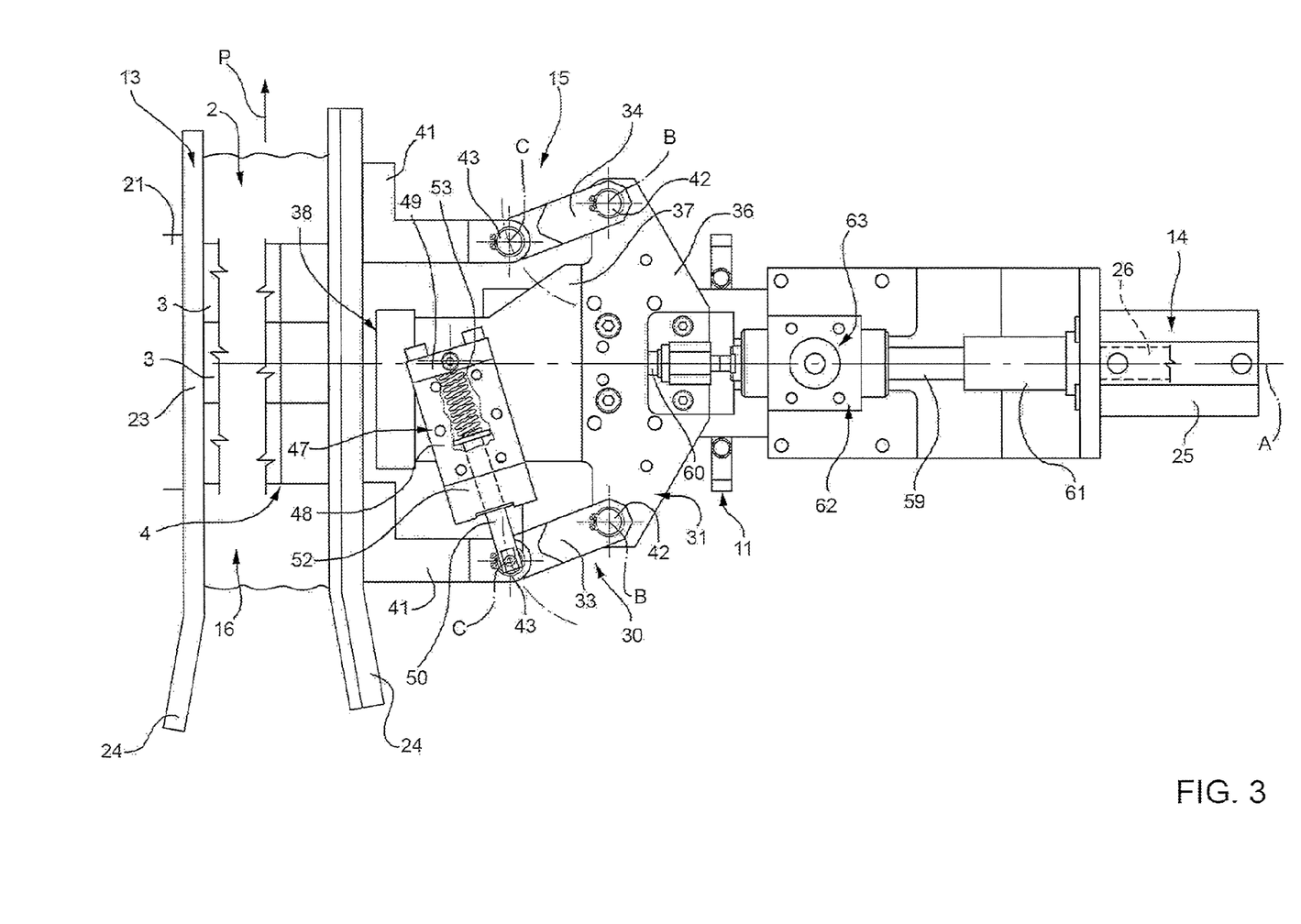

Number 1 in FIGS. 1 to 3 indicates as a whole a braking unit for selectively stopping one or more items advanced by a conveyor 2 (FIG. 1) along a transferring path P.

The unit 1 is used to particular advantage in plants for the production of packaging containers 3 of pourable food products, such as the packaging plants previously described.

The unit 1 can be used either with single packaging containers 3 or, as in the example shown, with multi-packs, i.e. packages, indicated with numeral reference 4 hereafter, which are formed by shrink-wrapped groups of a given number (nine in the embodiment shown in FIGS. 1 and 3) of packaging containers 3.

In particular, as visible in FIGS. 1 and 3, each package 4 has a parallelepiped shape and is, in turn, formed by parallelepiped-shaped packaging containers 3. It is clear that the unit 1 can be also used with packages formed by different types of packaging containers, such as gable-top containers, prismatic containers and so on.

Each package 4 (FIG. 1) is delimited by a front and a rear surface 5, 6, respectively located downstream and upstream with reference to path P, by opposite lateral surfaces 7, 8, by a bottom surface 9 cooperating in use with conveyor 2 and by a top surface 10, opposite bottom surface 9.

The unit 1 is mounted on a fixed frame 11 and basically comprises:
 a first and a second braking element 12, 13 arranged on opposite sides of conveyor 2 and facing each other;
 an actuator 14 which can be selectively activated for moving braking element 12 transversally with respect to path P and towards braking element 13 so as to clamp, between the braking elements 12, 13, the package or packages 4 to be braked; and
 lever means 15 connecting actuator 14 to braking element 12 and extendible towards braking element 13 as a result of the thrust exerted on the braking element 12 by the package or packages 4 to be braked.

As shown in FIG. 1, conveyor 2 is of the chain type and comprises a transport portion 16 defining a plane parallel to path P and on which packages 4 rest with their bottom surfaces 9 to be continuously advanced.

Frame 11, only partially shown in FIGS. 1 to 3, has an intermediate portion 20, which supports conveyor 2, and opposite lateral portions 21, 22 extending on both sides of the conveyor 2.

In particular, lateral portion 21 of frame 11 carries braking element 13, whilst lateral portion 22 carries braking element 12 and the other components of unit 1.

As visible in FIGS. 1 to 3, braking element 13 is secured to lateral portion 21 of frame 11 so as to have a fixed position.

Braking element 12 can be moved closer to, or away from, braking element 13 and is arranged, together with actuator 14 and lever means 15, on top of lateral portion 22 of frame 11.

Braking elements 12, 13 are defined by respective plates, which extend orthogonally to, and in an upper position than, transport portion 16 of conveyor 2 and have main portions 23 parallel to each other and upstream end portions 24 converging towards the main portions 23 in the advancing direction of packages 4.

During the braking action, braking elements 12, 13 cooperate with respective lateral surfaces 7, 8 of the package or packages 4 to be braked.

Actuator 14 is defined, in the example shown, by a pneumatic cylinder, which comprises a casing 25, secured to the top of lateral portion 22 of frame 11 at a given distance from braking element 12, and an output shaft 26 protruding from one side of casing 25, connected to braking element 12 through the interposition of lever means 15, and movable with respect to the casing 25 along a direction A orthogonal to main portions 23 of braking elements 12, 13 and transversal to path P at the working zone of unit 1.

As shown in FIGS. 1 to 3, output shaft 26 is coaxial to direction A.

Lever means 15 define, together with braking element 12, a four-bar linkage 30, which comprises:
 a slider 31 connected to output shaft 26 of actuator 14 and coupled, in a sliding manner, with a guide element 32 extending along direction A; and
 a pair of levers 33, 34 parallel to each other and connecting slider 31 to braking element 12.

As visible in FIG. 1, guide element 32 is formed by a bar having a T-shaped cross section and secured on top of lateral portion 22 of frame 11.

Slider 31 comprises a bottom portion 35 having a C-shaped cross section and coupled, in a sliding manner, onto guide element 32. Slider 31 further comprises a rear portion 36 connected to output shaft 26 of actuator 14 and a front portion 37 protruding from rear portion 36 towards braking element 12 and defining, with a front end surface 38, an abutment for main portion 23 of braking element 12, as it will be explained in more detail hereafter.

Each lever 33, 34 is hinged, at one end, to a relative one of the opposite sides of rear portion 36 of slider 31 and, at an opposite end, to a relative bracket 41 secured to main portion 23 of braking element 12.

In particular, the opposite ends of each lever 33, 34 are hinged to corresponding pins 42, 43, which are respectively carried by rear portion 36 of slider 31 and by the relative bracket 41 and have respective axes B, C orthogonal to direction A and to path P at the working zone of unit 1.

Lever 33 is located upstream of lever 34 with reference to the advancing direction of packages 4 along path P.

Each lever 33, 34 comprises a bar-shaped intermediate portion 44 extending parallel to pins 42, 43, a pair of arms 45 protruding orthogonally from the opposite ends of intermediate portion 44 and hinged to pin 42, and a further arm 46 protruding from a central part of intermediate portion 44, extending on the opposite side of the latter with respect to arms 45 and hinged to pin 43.

As visible in FIGS. 1 to 3, levers 33, 34 extend obliquely from pins 42 to pins 43 with respect to direction A and path P at the working zone of unit 1. In practice, each lever 33, 34 forms an angle with direction A.

More specifically, starting from respective pins 42, levers 33, 34 are upstream oriented with reference to the advancing direction of packages 4 along path P. In other words, starting from the respective pins 42, levers 33, 34 are oriented in such a way that the prolongation of the upstream lever (33) towards path P never meets direction A.

Brackets 41 are L-shaped in a top plan view (FIGS. 2 and 3) and protrude from main portion 23 of braking element 12 in a direction parallel to direction A towards levers 33, 34.

Lever means 15 are normally arranged in a first operating condition (FIGS. 1 and 2), in which they have a given extension in the direction A so as to avoid any interference between braking element 12 and the packages 4 advanced along path P, and can be displaced, as a result of the thrust exerted by the package or packages 4 to be braked on braking element 12, in a second operating condition (FIG. 3), in which they have an increased extension along direction A so as to reduce the distance of the braking element 12 from braking element 13.

In particular, the thrust exerted by the package or packages 4 to be braked on braking element 12 produces a rotation of levers 33, 34 about pins 42 so as to displace the braking element 12 in the advancing direction of packages 4 and towards braking element 13.

By comparing FIGS. 2 and 3, it is evident that levers 33, 34 reduce their angles with respect to direction A when lever means 15 are displaced from the first operating condition to the second operating condition.

Unit 1 further comprises a spring device 47 for displacing lever means 15 in the first operating condition when the braking action of unit 1 ceases; spring device 47 is arranged above slider 31 and comprises a casing 48 having one end 49 hinged to the front portion 37 of slider 31, a rod 50 protruding from an opposite end 52 of casing 48 and hinged to the pin 43 linked to lever 33, and a helical spring 53 (FIGS. 2 and 3) housed inside casing 48 and interposed between the end 49 thereof and the rod 50. Spring device 47 extends along a direction diverging from braking element 12 towards upstream end portion 24 thereof.

When lever means 15 are displaced from the first operating condition to the second operating condition, the spring 53 is compressed and returns to the undeformed configuration upon release of the braking action. In this condition, main portion 23 of braking element 12 abuts against front end surface 38 of slider 31.

Unit 1 further comprises spring means 55 interposed between braking element 12 and actuator 14.

In the embodiment shown in FIGS. 1 to 4, spring means 55 comprise a helical spring 56 axially interposed between one end 57 of output shaft 26 and one end 58 of a coaxial transmission shaft 59 connecting slider 31 to actuator 14.

Output shaft 26 has one opposite end (not visible in the enclosed Figures) arranged inside casing 25, whilst transmission shaft 57 has one opposite end 60 connected to rear portion 36 of slider 31.

As shown in FIGS. 1 to 3, spring 56 is housed inside a sleeve element 61 secured to casing 25 and protruding therefrom along direction A; end 57 of output shaft 26 and end 58 of transmission shaft 59 are both arranged within sleeve element 61 and slidably coupled thereto.

Unit 1 further comprises a locking device 62 for locking transmission shaft 59, and therefore output shaft 26, in a given axial position.

When locking device 62 exerts the locking action on transmission shaft 59, any displacement of braking element 12 and lever means 15 is independent from transmission shaft 59 and output shaft 26.

Figure 4:
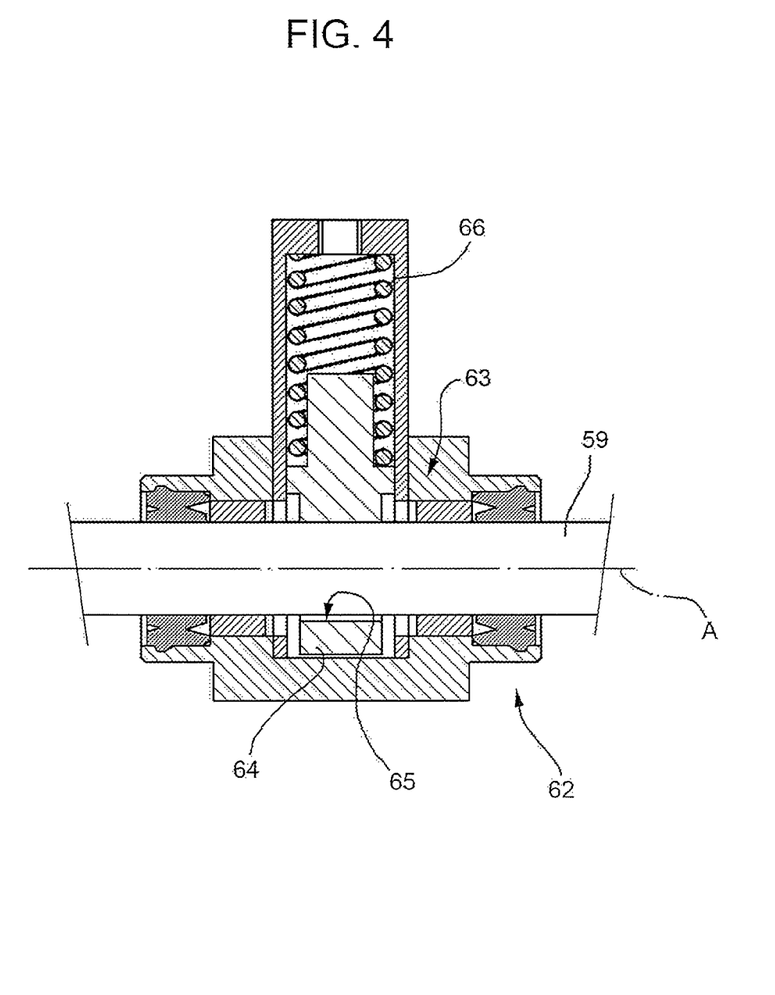
FIG. 4 shows a larger-scale section along line IV-IV in FIG. 2.

As shown in detail in FIG. 4, locking device 62 basically comprises:
- a casing 63 secured to the top of the lateral portion 22 of frame 11 and fluid-tightly crossed, in a sliding manner along direction A, by transmission shaft 59;
- a sleeve element 64 mounted within casing 63 in a sliding manner along a radial direction with respect to direction A and having a through hole 65 engaged with radial play by transmission shaft 59; and
- a helical spring 66 radially loading sleeve element 64 so as to push part of the lateral edge of hole 65 against transmission shaft 59, locking it axially.

Locking device 62 is normally set in an active condition and can be pneumatically deactivated so as to compress spring 66 and allow sleeve element 64 to reach a centered or coaxial position with respect to transmission shaft 59, which is therefore free to move axially through hole 65.

In use, unit 1 is normally set in a condition in which braking element 12 does not interact with the packages 4 advanced by conveyor 2.

When it is necessary to stop temporarily the package or packages 4 moving along path P, actuator 14 is activated and locking device 62 is deactivated so as to allow output shaft 26 and transmission shaft 59 to be displaced along direction A.

As a result of the axial displacement of shafts 26, 59, slider 31 is advanced in a corresponding manner along direction A by sliding along guide element 32 and braking element 12 is brought into contact with the package or packages 4 to be braked.

During this movement, should the user put his fingers or other parts of his body between the braking element 12 and the package or packages 4 to be braked, spring 56 would compress. In this way, the only force acting on the user would be the load of spring 56, which is designed to be suitable to clamp the package or packages 4 to be braked between the braking elements 12 and 13 but not enough to hurt the user.

At this point, i.e. after braking element 12 has reached a contact position with the package or packages 4 to be braked, locking device 62 is left to exert its locking action on transmission shaft 59.

The thrust exerted by the package or packages 4 to be braked on braking element 12 produces a rotation of levers 33, 34 about pins 42 so as to displace the braking element 12 in the advancing direction of packages 4 and towards braking element 13.

In practice, lever means 15 reach a second operating condition (FIG. 3), in which they have an increased extension along direction A so as to reduce the distance of the braking element 12 from braking element 13 and to increase the pressure on the packages 4 to be braked.

If the queue of packages 4 stopped by unit 1 increases, the thrust that they exert on braking element 12 increases too and produces a further rotation of levers 33, 34 about pins 42 and a consequent additional displacement of the braking element 12 in the advancing direction of the packages 4 and towards the braking element 13. In practice, the clamping force on the packages 4 increases when the number of packages 4 forming the queue increases.

In order to allow the packages 4 to advance again along path P, locking device 62 is deactivated to free transmission shaft 59, and actuator 14 is activated to move braking element 12 away from the packages 4.

In the meantime, the spring 53 of spring device 47, as it is no more subjected to the thrust of packages 4, can return to the undeformed configuration so displacing lever means 15 to the first operating condition.

Figure 5:
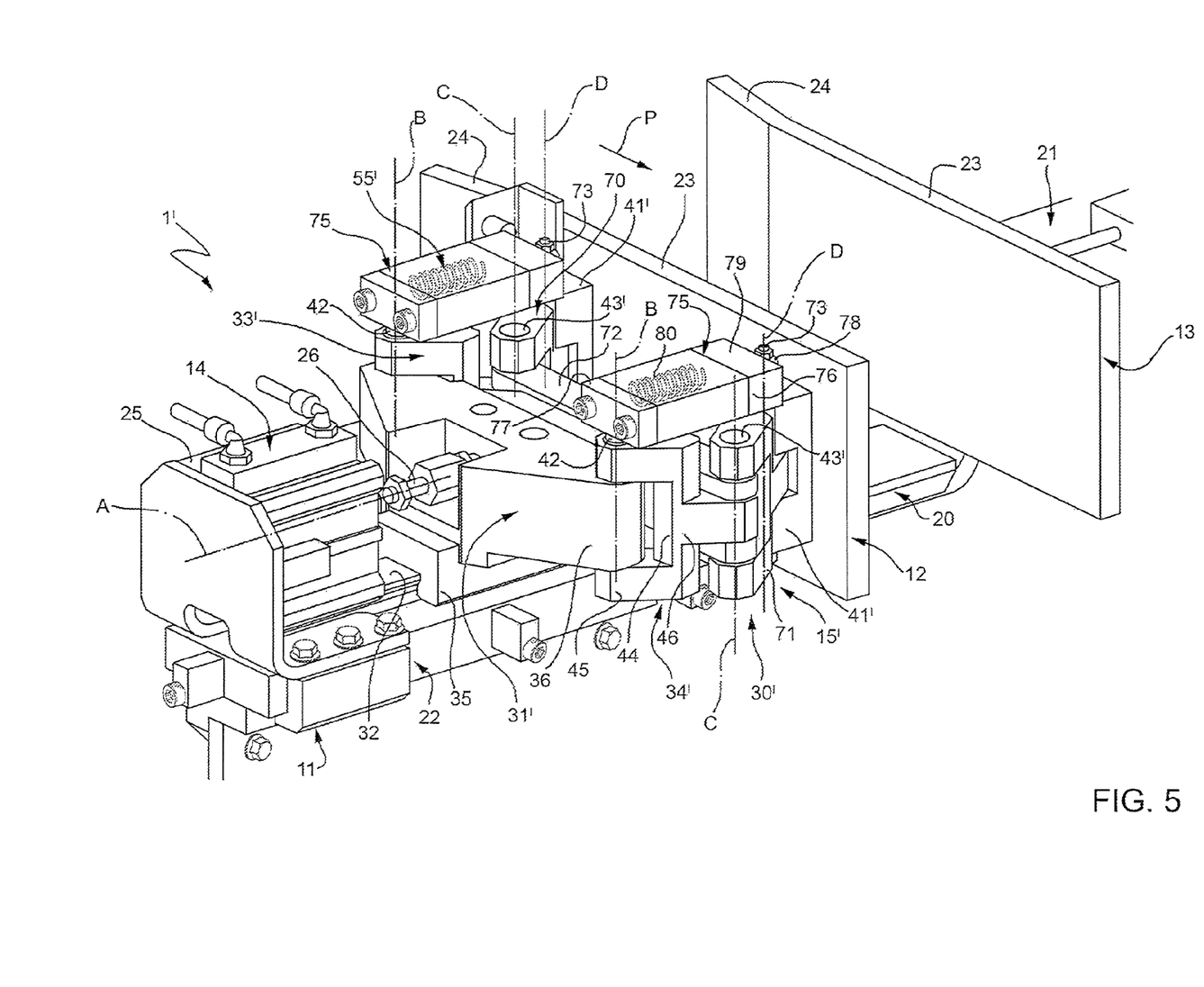
FIG. 5 shows a view in perspective, with parts removed for clarity, of a different embodiment of a braking unit in accordance with the teachings of present invention.
Figure 6:
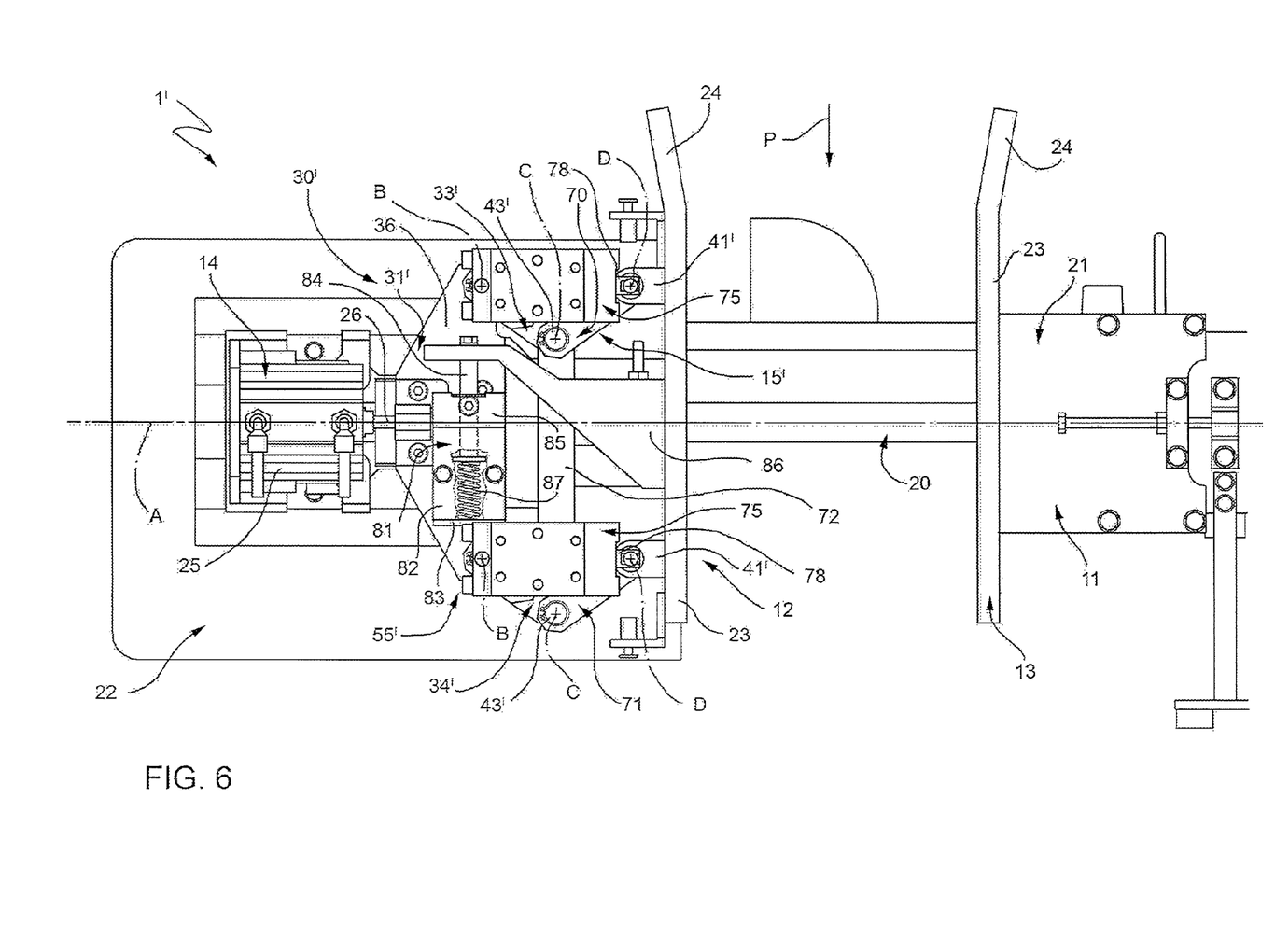
FIG. 6 shows a top plan view of the FIG. 5 braking unit.
Figure 7:
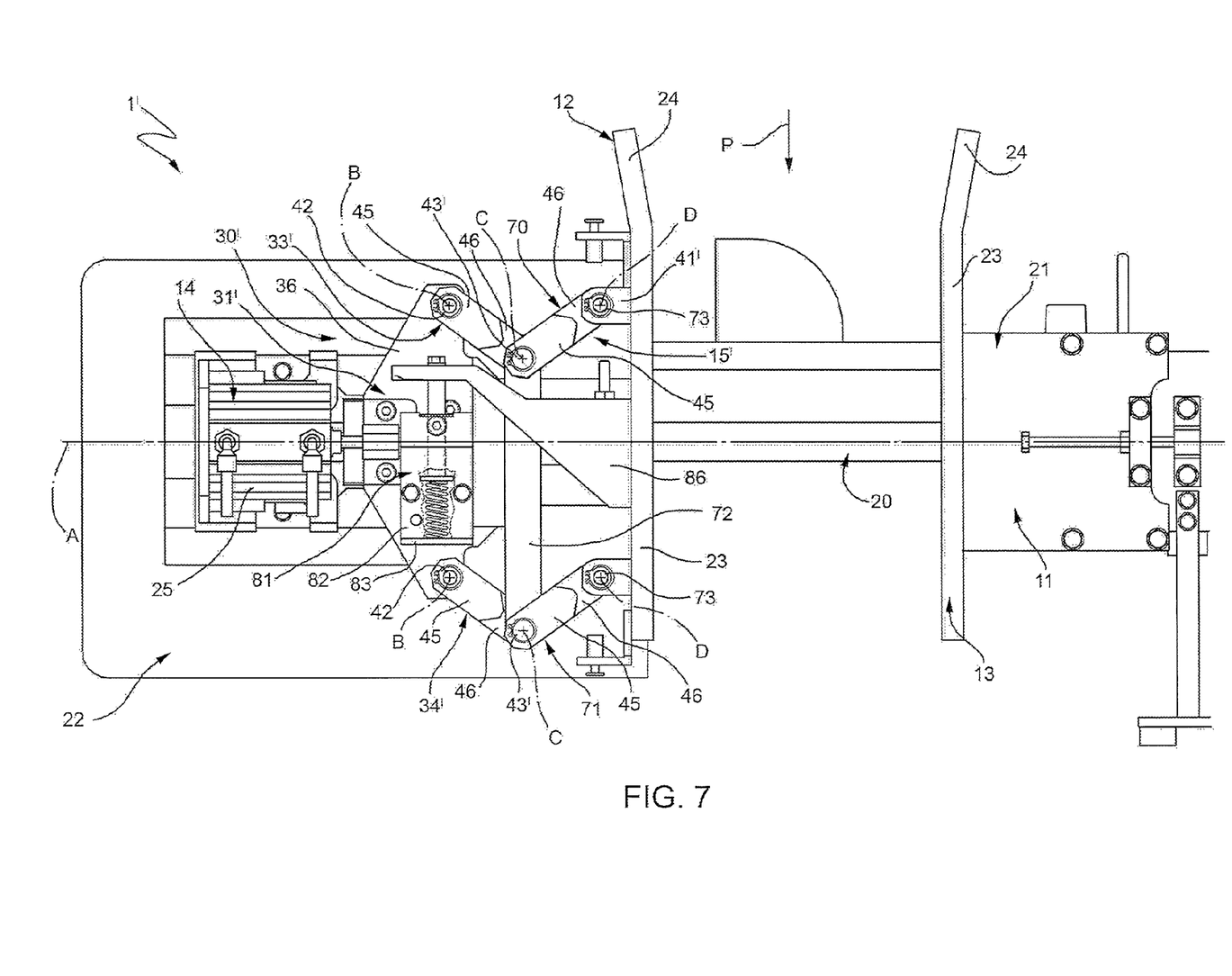
FIG. 7 shows a top plan view of the FIG. 5 braking unit, with parts removed for clarity.

Number 1' in FIGS. 5 to 7 indicates as a whole a different embodiment of a braking unit in accordance with the teachings of the present invention; units 1 and 1' being similar to each other, the following description is limited to the differences between them, and using the same references, where possible, for identical or corresponding parts.

Unit 1' basically differs from unit 1 by comprising a double four-bar linkage 30' in place of the single four-bar linkage 30, and spring means 55' acting on linkage 30' instead of cooperating with output shaft 26. Moreover, in this case, unit 1' lacks locking device 62.

In particular, linkage 30' is defined by braking element 12, by a slider 31', only formed by portions 35 and 36 of slider 31 and directly connected to end 57 of output shaft 26, and by lever means 15' in turn comprising:

- a pair of first parallel levers 33', 34' identical to levers 33, 34 and hinged, at their first ends, to the opposite sides of portion 36 of slider 31' through the respective pins 42 of axes B;
- a pair of second parallel levers 70, 71 having shapes identical to the ones of levers 33', 34' and which are hinged to second ends of the levers 33', 34' and to respective brackets 41' secured to the main portion 23 of braking element 12; and
- a bar 72 hinged to levers 33', 34', 70 and 71 and extending parallel to main portions 23 of braking elements 12, 13 and orthogonal to direction A.

In particular, the arms 45 of each lever 70, 71 are hinged to arm 46 of the relative lever 33', 34' through a relative pin 43' of axis C parallel to axis B, whilst the arm 46 of ach lever 70, 71 is hinged to a relative bracket 41' through a relative pin 73 having an axis D parallel to axes B, C and carried by said bracket 41'.

Lever 70 is located upstream of lever 71 with reference to the advancing direction of packages 4 along path P.

Bar 72 has opposite ends hinged to pins 43'.

In this case, brackets 41' are formed by respective bars protruding from main portion 23 of braking element 12 in a direction parallel to direction A towards levers 70, 71.

As visible in FIGS. 5 to 7, levers 33', 34' extend obliquely from pins 42 to pins 43' with respect to direction A and path P at the working zone of unit 1 and are downstream oriented with reference to the advancing direction of packages 4. In other words, starting from respective pins 42, levers 33', 34' are oriented in such a way that the prolongation of the downstream lever (34') towards path P never meets direction A.

Levers 70, 71 are instead oriented in the same way as levers 33, 34 of unit 1.

Also in this case, lever means 15' are normally arranged in a first operating condition (FIGS. 5 to 7), in which they have a given extension in the direction A so as to avoid any interference between braking element 12 and the packages 4 advanced along path P, and can be displaced, as a result of the thrust exerted by the package or packages 4 to be braked on braking element 12, in a second operating condition (not shown), in which they have an increased extension along direction A so as to reduce the distance of the braking element 12 from braking element 13.

In particular, the thrust exerted by the package or packages 4 to be braked on braking element 12 produces, through the rotation of levers 33', 34', 70, 71, a displacement of the braking element 12 in the advancing direction of packages 4 and towards braking element 13.

As shown in FIGS. 5 to 7, spring means 55' are interposed between braking element 12 and slider 31'.

In particular, spring means 55' comprise a pair of spring devices 75, identical to spring device 47 of unit 1 and extending parallel to direction A and on opposite sides thereof; each spring device 75 is arranged above one of levers 33', 34' and the relative lever 70, 71 directly connected thereto and is hinged to relative pins 42 and 73.

More specifically, each spring device 75 comprises a casing 76 having one end 77 hinged to the relative pin 42 carried by slider 31', a rod 78 protruding from an opposite end 79 of casing 76 and hinged to the relative pin 73 carried by the relative bracket 41', and a helical spring 80 (FIG. 5) housed inside casing 76 and interposed between the end 77 thereof and the rod 78.

With reference to FIGS. 6 and 7, unit 1' further comprises an additional spring device 81 for displacing lever means 15' in the first operating condition when the braking action of unit 1' ceases; spring device 81 is identical to spring devices 75, is arranged above slider 31' and extend parallel to main portion 23 of braking elements 12, 13.

In particular, spring device 81 comprises a casing 82 having one end 83 hinged to slider 31', a rod 84 protruding from an opposite end 85 of casing 82 and linked into a slot (not visible) of a bracket 86 projecting from main portion 23 of braking element 12, and a helical spring 87 housed inside casing 82 and interposed between the end 83 thereof and the rod 84.

When lever means 15' are displaced from the first operating condition to the second operating condition, the spring 87 is compressed and returns to the undeformed configuration upon release of the braking action.

The operation of unit 1' is completely analogous to the one of unit 1.

When it is necessary to stop temporarily the package or packages 4 moving along path P, actuator is activated and output shaft 26 and slider 31' are moved along direction A in order to bring braking element 12 into contact with the package or packages 4 to be braked.

During this movement, should the user put his fingers or other parts of his body between the braking element 12 and the package or packages 4 to be braked, springs 80 of spring devices 75 would compress. In this way, the only force acting on the user would be the load of springs 80, which is designed to be suitable to clamp the package or packages 4 to be braked between the braking elements 12 and 13 but not enough to hurt the user.

At this point, i.e. after braking element 12 has reached a contact position with the package or packages 4 to be braked, the thrust exerted by the package or packages 4 to be braked on braking element 12 produces, through the linkage 30', a displacement of the braking element 12 in the advancing direction of packages 4 and towards braking element 13.

In practice, lever means 15' reach a second operating condition, in which they have an increased extension along direction A so as to reduce the distance of the braking element 12 from braking element 13 and to increase the pressure on the packages 4 to be braked.

If the queue of packages 4 stopped by unit 1' increases, the thrust that they exert on braking element 12 increases too and produces a further rotation of levers 33', 34', 70, 71 and a consequent additional displacement of the braking element 12 in the advancing direction of the packages 4 and towards the braking element 13. In practice, the clamping force on the packages 4 increases when the number of packages 4 forming the queue increases.

In order to allow the packages 4 to advance again along path P, actuator 14 is activated to move braking element 12 away from the packages 4.

In the meantime, the spring 87 of spring device 81, as it is no more subjected to the thrust of packages 4, can return to the undeformed configuration so displacing lever means 15' to the first operating condition.

The advantages of braking units 1, 1' according to the present invention will be clear from the foregoing description.

In particular, braking units 1, 1' are very effective in stopping any number of packages 4 in a row without damaging them. As a matter of fact, units 1, 1' are adapted to exert a clamping force on the packages 4, which increases upon an increase of the number of packages 4 forming the queue.

As a consequence of this sort of "automatic" increase of the clamping force, it can be maintained at a relatively low level when the braking units 1, 1' act on a single package 4 or on a few packages 4 so as to not damage it or them. At the same time, the braking units 1, 1' do not loose their effectiveness over a certain number of packages 4 in the row, but rather they become more effective thanks to the provision of the lever means 15, 15'.

Moreover, the braking units 1, 1' are particularly safe for the user, since the only force that would act on the latter, should him put his fingers between the packages 4 and the braking element 12, would be the load of the spring means 55, 55'; in this way, braking units 1, 1' do not require any protection device around the working area.

Clearly, changes may be made to braking units 1, 1' without, however, departing from the protective scope defined in the accompanying claims.

The invention claimed is:

1. A braking unit for selectively stopping one or more items advanced by a conveyor along a transferring path, said braking unit comprising:
    a first braking element and a second braking element, the first and second braking elements arranged on opposite sides of said conveyor and facing each other;
    actuator means selectively activated for moving said first braking element towards said second braking element so as to clamp the one or more items to be braked between the first braking element and the second braking element; and
    lever means connecting said actuator means to said first braking element and movable towards said second braking element as a result of thrust exerted on said first braking element by the one or more items to be braked.

2. The braking unit of claim 1, wherein said lever means are normally arranged in a first operating condition, in which they have a given extension in a direction transversal to said path at the working zone of the braking unit so as to avoid any interference between the first braking element and the one or more items advanced along said path, and said lever means are displaceable, as a result of the thrust exerted by the one or more items to be braked on said first braking element, in a second operating condition, in which they have an increased extension along said direction so as to reduce the distance between said first and second braking element.

3. The braking unit of claim 1, wherein it further comprises spring means interposed between said first braking element and said actuator means.

4. The braking unit of claim 1, wherein it further comprises a slider connected to an output member of said actuator means and coupled in a sliding manner with guide means extending along said direction.

5. The braking unit of claim 4, wherein said lever means define, together with said first braking element and said slider, at least one four-bar linkage.

6. The braking unit of claim 4, wherein said lever means comprise a pair of levers hinged, on one side, to respective first pins carried by said slider, and, on the other side, to respective second pins carried by said first braking element; said first and second pins having axes orthogonal to said direction and to said path at the working zone of the braking unit.

7. The braking unit of claim 6, wherein said levers extend obliquely from said first pins to said second pins with respect to said direction and said path at the working zone of the braking unit and are upstream oriented with reference to the advancing direction of said one or more items.

8. The braking unit of claim 4, wherein said spring means comprise a spring element interposed between said actuator means and said slider.

9. The braking unit of claim 4, wherein it further comprises releasable locking means for locking said output member of said actuator means in a given axial position.

10. The braking unit of claim 4, wherein said spring means are interposed between said first braking element and said slider.

11. The braking unit of claim 4, wherein said lever means define, together with said first braking element and said slider, a double four-bar linkage.

12. The braking unit of claim 11, wherein said lever means comprise:
    a pair of first levers parallel to each other and hinged to first pins carried by said slider and having axes orthogonal to said direction and to said path at the working zone of the braking unit;
    a pair of second levers parallel to each other and hinged, on one side, to second pins carried by said first braking element, and, on the other side, to the respective first levers through respective third pins parallel to said first and second pins; and
    a bar transversal to said first and second levers and having opposite ends hinged to said third pins.

13. The braking unit of claim 12, wherein said spring means comprise a pair of spring elements extending parallel to said direction and on opposite sides thereof and each of which is interposed between a relative one of said first pins and a relative one of said second pins.

14. The braking unit of claim 2, wherein it comprises additional spring means for displacing said lever means in the first operating condition when the braking action ceases.

15. A braking unit for selectively stopping one or more items advanced by a conveyor along a transferring path, the braking unit comprising:
    a first braking element and a second braking element, the first and second braking elements arranged on opposite sides of the conveyor and facing each other;
    actuator means selectively activated for moving the first braking element towards the second braking element so as to clamp the one or more items to be braked between the first braking element and the second braking element;
    lever means connecting the actuator means to the first braking element and movable towards the second braking element as a result of thrust exerted on the first braking element by the one or more items to be braked; and
    a slider connected to an output member of the actuator means and coupled in a sliding manner with a guide element extending toward the second braking element.

16. A braking unit for selectively stopping one or more items advanced by a conveyor in a movement direction, the braking unit comprising:
    a first braking element and a second braking element, the first and second braking elements being arranged on opposite sides of the conveyor;
    at least two levers each hinged at one end to the first braking element at a first hinged connection and each hinged at an opposite end at a second hinged connection;
    an actuator configured to translate the at least two levers and the first braking element toward the second braking element in a direction transverse to the movement direction of the one or more items;

the at least two levers extending obliquely to the movement direction, each of the two levers being arranged so that the first hinged connection of the lever is positioned upstream of the second hinged connection of the lever relative to the movement direction; and wherein the opposite end of each of the at least two levers is hinged to a slider or a bar at the second hinged connection.

17. A braking unit for selectively stopping one or more items advanced by a conveyor in a movement direction, the braking unit comprising:

a first braking element and a second braking element, the first and second braking elements being arranged on opposite sides of the conveyor;

at least two levers each hinged at one end to the first braking element at a first hinged connection and each hinged at an opposite end at a second hinged connection;

an actuator configured to translate the at least two levers and the first braking element toward the second braking element in a direction transverse to the movement direction of the one or more items;

the at least two levers extending obliquely to the movement direction, each of the two levers being arranged so that the first hinged connection of the lever is positioned upstream of the second hinged connection of the lever relative to the movement direction;

wherein the opposite end of each of the at least two levers is hinged to a bar at the second hinged connection; and wherein the at least two levers are first levers, and the bar is linked to a slider by at least two second levers, each of the at least two levers being hinged to the slider at a third hinged connection that is upstream of the second hinged connection of the lever relative to the movement direction.

18. The braking unit of claim 16, wherein the opposite end of each of the at least two levers is hinged to the slider at the second hinged connection.

* * * * *